(12) United States Patent
Pirayesh et al.

(10) Patent No.: US 12,350,904 B2
(45) Date of Patent: Jul. 8, 2025

(54) GLASS-BASED MATERIALS WITH ADHESIVE AND COMPLEX GEOMETRY

(71) Applicant: CORNING INCORPORATED, Corning, NY (US)

(72) Inventors: Hamidreza Pirayesh, Corning, NY (US); Kevin Barry Reiman, Horseheads, NY (US); Ljerka Ukrainczyk, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 622 days.

(21) Appl. No.: 17/533,549

(22) Filed: Nov. 23, 2021

(65) Prior Publication Data

US 2022/0168999 A1    Jun. 2, 2022

Related U.S. Application Data

(60) Provisional application No. 63/119,209, filed on Nov. 30, 2020.

(51) Int. Cl.
*B32B 17/06* (2006.01)
*B32B 3/26* (2006.01)
(Continued)

(52) U.S. Cl.
CPC .............. *B32B 17/06* (2013.01); *B32B 3/266* (2013.01); *B32B 7/022* (2019.01); *B32B 7/12* (2013.01);
(Continued)

(58) Field of Classification Search
None
See application file for complete search history.

(56) References Cited

U.S. PATENT DOCUMENTS

| 8,854,623 B2 | 10/2014 | Fontaine et al. |
| 2009/0042040 A1 | 2/2009 | Paul et al. |

(Continued)

FOREIGN PATENT DOCUMENTS

| ES | 2369221 T3 | 11/2011 |
| WO | 2018/038967 A1 | 3/2018 |

(Continued)

OTHER PUBLICATIONS

ASTM standard C770-16, entitled "Standard Test Method for Measurement of Glass Stress-Optical Coefficient".
(Continued)

*Primary Examiner* — David Sample

(57) ABSTRACT

An article comprises a first plate, a second plate and a cured adhesive layer. The first plate is made of a first chemically-strengthened glass-based material. The first plate comprises: a first major surface opposing a second major surface and a thickness equal to or greater than 0.4 mm and less than or equal to 3.0 mm. The second plate is made of a second chemically-strengthened transparent glass-based material. The second plate comprises: a first major surface opposing a second major surface and a thickness equal to or greater than 0.4 mm and less than or equal to 3.0 mm. The cured adhesive layer adheres a portion of the first major surface of the plate to the second major surface of the second plate. The second plate has an area equal to or less than 25% of the area of the first plate.

21 Claims, 11 Drawing Sheets

(51) Int. Cl.
  *B32B 7/022* (2019.01)
  *B32B 7/12* (2006.01)
  *B32B 37/12* (2006.01)
  *C03C 21/00* (2006.01)
  *H04N 5/225* (2006.01)
  *H04N 23/57* (2023.01)

(52) U.S. Cl.
  CPC ............ *B32B 37/12* (2013.01); *C03C 21/002* (2013.01); *H04N 23/57* (2023.01); *B32B 2037/1253* (2013.01); *B32B 2250/02* (2013.01); *B32B 2307/412* (2013.01); *B32B 2307/558* (2013.01); *B32B 2307/732* (2013.01); *B32B 2309/105* (2013.01); *B32B 2310/0418* (2013.01); *B32B 2315/08* (2013.01); *B32B 2457/00* (2013.01); *B32B 2559/00* (2013.01)

(56) References Cited

U.S. PATENT DOCUMENTS

| | | | |
|---|---|---|---|
| 2014/0218187 A1* | 8/2014 | Chun | G16H 40/67 340/439 |
| 2015/0274585 A1 | 10/2015 | Rogers et al. | |
| 2018/0132371 A1 | 5/2018 | Yeum et al. | |
| 2018/0208494 A1* | 7/2018 | Mattelet | C03C 3/087 |
| 2019/0100958 A1* | 4/2019 | Baquet | B32B 38/0004 |
| 2019/0161402 A1 | 5/2019 | Harris et al. | |
| 2019/0300422 A1 | 10/2019 | Guo et al. | |
| 2020/0017399 A1 | 1/2020 | Click et al. | |

FOREIGN PATENT DOCUMENTS

| | | | | |
|---|---|---|---|---|
| WO | WO-2019241013 A1 | * | 12/2019 | ............ B60K 35/00 |
| WO | WO-2020041015 A1 | * | 2/2020 | ............ B32B 17/06 |

OTHER PUBLICATIONS

International Search Report and Written Opinion of the International Searching Authority; PCT/US2021/060303; mailed on Mar. 18, 2022, 11 pages; European Patent Office.

"Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992)".

A. Plobl, et al., "Wafer Direct Bonding: Tailoring Adhesion Between Brittle Materials", Materials Science and Engineering, vol. R25, 1999, pp. 1-88.

ASTM standard C770-16, entitled "Standard Test Method for Measurement of Glass Stress-Optical Coefficient,", 2013.

Daizo Ando, et al., "Glass Direct Bonding Technology for Hermetic Seal Package", IEEE, 1997.

P. Rangsten, et al., "Quartz-toQuartz Direct Bonding", Journal of Electrochemical Society, vol. 146 Issue 3, 1999, pp. 1104-1105.

Reddy, K.P.R. et al, "Fracture Toughness Measurement of Glass and Ceramic Materials Using Chevron-Notched Specimens," J. Am. Ceram. Soc., vol. 71, No. 6, 1988, pp. C-310-C-313.

* cited by examiner

GLASS-BASED MATERIALS WITH ADHESIVE AND COMPLEX GEOMETRY

This application claims the benefit of priority under 35 U.S.C. § 119 of U.S. Provisional Application Ser. No. 63/119,209 filed on Nov. 30, 2020 the content of which is relied upon and incorporated herein by reference in its entirety.

FIELD

The present disclosure relates generally to glass-based articles, and more particularly, articles including glass-based materials and adhesive to achieve complex geometries.

BACKGROUND

Next generations of mobile electronic application products require more complex shapes and variable thicknesses. One example of such a device is a phone or tablet with a raised camera block.

Making a glass or glass ceramic part with a complex shape or variable thickness can be costly and time consuming. One method of doing so is to start with thicker sheet and machine to the desired size. But, this method has two major disadvantages: material waste that can approach or exceed 50%, for example, for a finished part with a raised block having a thickness around double that of the rest of the part, and a time consuming finishing process.

There is a need for a lower cost process that results in the desired finished shape, or at least a "near net" shape that can be machined into the desired finished shape without excessive material removal.

SUMMARY

The following presents a simplified summary of the disclosure to provide a basic understanding of some embodiments described in the detailed description.

In a first aspect, an article comprises a first plate, a second plate and a cured adhesive layer. The first plate is made of a first chemically-strengthened glass-based material. The first plate comprises: a first major surface opposing a second major surface and a thickness equal to or greater than 0.4 mm and less than or equal to 3.0 mm. The second plate is made of a second chemically-strengthened transparent glass-based material. The second plate comprises: a first major surface opposing a second major surface and a thickness equal to or greater than 0.4 mm and less than or equal to 3.0 mm. The cured adhesive layer adheres a portion of the first major surface of the plate to the second major surface of the second plate. The second plate has an area equal to or less than 25% of the area of the first plate.

In a second aspect, for the first aspect, the adhesive has a bond strength lower than the failure strength of the first transparent glass-based material and lower than the failure strength of the second glass-based material.

In a third aspect, for any preceding aspect, the adhesive has an adhesive bond strength sufficient to allow displacement of equal to or greater than 1 mm/35 mm span in a 3-point bend test before delamination.

In a fourth aspect, for any preceding aspect, the length of the second plate is equal to or less than 0.5 of the length of the first plate, and the width of the second plate is equal to or less than 0.5 of the width of the first plate.

In a fifth aspect, for any preceding aspect, the first plate is rectangular in shape with a length of 60 mm to 180 mm, and a width of 50 mm to 120 mm. The the second plate is rectangular in shape with a length of 10 mm to 45 mm, and a width of 10 mm to 45 mm.

In a sixth aspect, for any preceding aspect, the first plate is rectangular in shape with a length of 150 mm to 550 mm, and a width of 100 mm to 360 mm. The second plate is rectangular in shape with a length of 10 mm to 90 mm, and a width of 10 mm to 90 mm.

In a seventh aspect, for any preceding aspect, the article is transparent, and the cured adhesive layer is made of a cured optically clear adhesive.

In an eighth aspect, for any preceding aspect, the article further comprises at least one hole extending through the first plate, the cured adhesive layer and the second plate.

In a ninth aspect, for the eighth aspect, the article further comprises a camera assembly disposed at least partially within the at least one hole and protruding from the second major surface of the second plate.

In a tenth aspect, for any preceding aspect, each of the first and second chemically-strengthened glass-based materials are independently selected from: a glass material having a fracture toughness equal to or greater than $0.75$ $MPa\sqrt{m}$; and a glass-ceramic material having a fracture toughness equal to or greater than $1.0$ $MPa\sqrt{m}$.

In an eleventh aspect, for any preceding aspect, the first plate is made of: (i) a chemically-strengthened glass material with a DOC equal to or greater than 0.09*t; or (ii) a chemically strengthened glass-ceramic material with a DOC equal to or greater than 0.09*t. The second plate is made of: (i) a chemically strengthened glass material having: a CS equal to or greater than 550 MPa; and a DOL equal to or greater than 4 microns; or (ii) a chemically strengthened glass-ceramic material having: a CS equal to or greater than 200 MPa; and a DOL equal to or greater than 4 microns.

In a twelfth aspect, for any preceding aspect, The article of any preceding claim, the first plate is made of: (i) a chemically-strengthened glass material with a DOC equal to or greater than 0.09*t; or (ii) a chemically strengthened glass-ceramic material with a DOC equal to or greater than 0.09*t; and the second plate is made of: (i) a chemically strengthened glass material having: a CS equal to or greater than 600 MPa; and a DOL equal to or greater than 10 microns; or (ii) a chemically strengthened glass-ceramic material having: a CS equal to or greater than 200 MPa; and a DOL equal to or greater than 10 microns.

In a thirteenth aspect, for any preceding aspect, the first chemically-strengthened transparent glass-based material and the second chemically-strengthened transparent glass-based material are both glass materials.

In a fourteenth aspect, for any preceding aspect, the first chemically-strengthened transparent glass-based material and the second chemically-strengthened transparent glass-based material are both glass-ceramic materials.

In a fifteenth aspect, for any preceding aspect, the first chemically-strengthened transparent glass-based material is a glass material, and the second chemically-strengthened transparent glass-based material is a glass-ceramic material.

In a sixteenth aspect, for any preceding aspect, the first chemically-strengthened transparent glass-based material is a glass-ceramic material, and the second chemically-strengthened transparent glass-based material is a glass material.

In a seventeenth aspect, for any preceding aspect, the first chemically-strengthened transparent glass-based material and the second chemically-strengthened transparent glass-based material are the same material.

In an eighteenth aspect, for any preceding aspect, the first chemically-strengthened transparent glass-based material and the second chemically-strengthened transparent glass-based material are different materials.

In a nineteeth aspect, a method of fabricating an article is provided. The article comprises a first plate, a second plate and a cured adhesive layer. The first plate is made of a first chemically-strengthened glass-based material. The first plate comprises: a first major surface opposing a second major surface and a thickness equal to or greater than 0.4 mm and less than or equal to 3.0 mm. The second plate is made of a second chemically-strengthened transparent glass-based material. The second plate comprises: a first major surface opposing a second major surface and a thickness equal to or greater than 0.4 mm and less than or equal to 3.0 mm. The cured adhesive layer adheres a portion of the first major surface of the plate to the second major surface of the second plate. The second plate has an area equal to or less than 25% of the area of the first plate. The article may further include any of the first through eighteenth aspects. The method comprises ion-exchanging the first substrate and ion-exchanging the second substrate. After ion-exchanging the first substrate and the second substrate, the first substrate is attached to the second substrate with the adhesive layer. Then, the adhesive layer is cured.

In a twentieth aspect, for the nineteenth aspect, during ion exchanging, the first plate and the second plate are exposed to different conditions.

In a twenty-first aspect, for any of aspects 18 and 19, the method further comprises: creating a first hole through the first substrate prior to ion exchanging the first substrate; creating a second hole through the second substrate prior to ion exchanging the substrate substrate, the second hole having a cross-section similar to that of the first hole; and aligning the first hole with the second hole when attaching the first substrate to the second substrate.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

Figure 1:
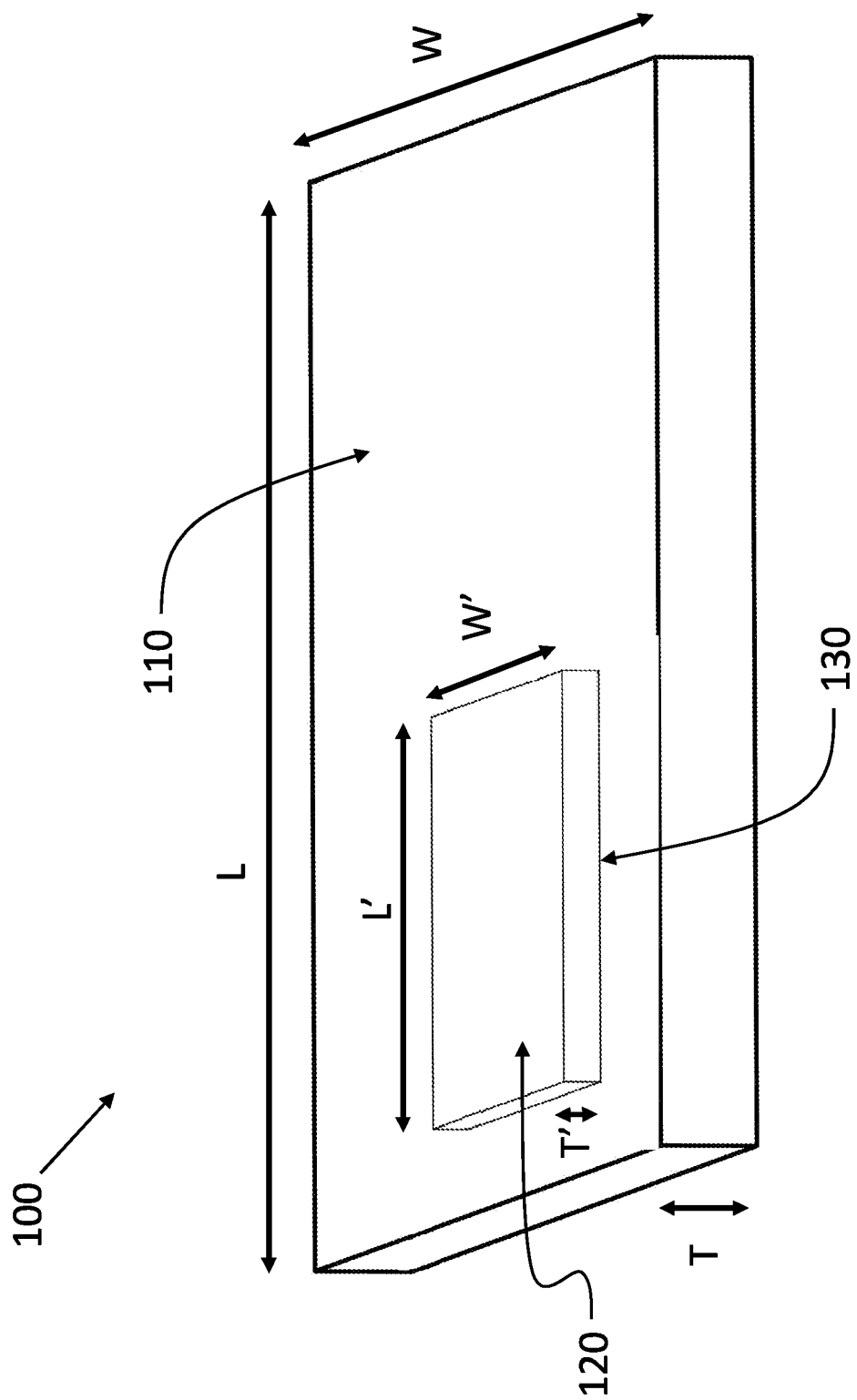
FIG. 1 illustrates an article having a planar substrate with a raised portion.

Figures are not necessarily drawn to scale.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Glossary

A—As used herein the terms "the," "a," or "an," mean "one or more," and should not be limited to "only one" unless explicitly indicated to the contrary. Thus, for example, reference to "a component" includes embodiments having two or more such components unless the context clearly indicates otherwise.

About—As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Central Tension—central tension (CT) and maximum CT values are measured using a scattered light polariscope (SCALP) techniques known in the art. Refracted near-field (RNF) method or SCALP may be used to measure the stress profile. When the RNF method is utilized, the maximum CT value provided by SCALP is utilized. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass-based article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The RNF profile is then smoothed, and used for the CT region.

Chemically Strengthened—As used herein, a glass-based article is considered chemically strengthened if it has been exposed to an ion exchange process. In this process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass-based substrate generate a stress in the resulting glass-based article. Chemical strengthening may be detected, for example, by microprobe analysis to determine a profile of composition vs. depth.

Comprising—As used herein, the terms "comprising" and "including," and variations thereof shall be construed as synonymous and open-ended, unless otherwise indicated.

Compressive Stress—Compressive stress (including surface CS, or $CS_S$) is measured by surface stress meter (FSM) using commercially available instruments such as the FSM-6000, manufactured by Orihara Industrial Co., Ltd. (Japan). Surface CS is the compressive stress at the surface of an article. Surface CS stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

According to some conventions used in the art, compression is expressed as a negative (<0) stress and tension is expressed as a positive (>0) stress, unless specifically noted otherwise. Throughout this description, however, when speaking in terms of compressive stress CS, such is given without regard to positive or negative values—i.e., as recited herein, CS=|CS|.

Depth of Compression—As used herein, depth of compression (DOC) means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

DOL—As used herein, the terms "chemical depth", "chemical depth of layer", "depth of chemical layer" and "depth of layer (DOL) may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA) or Glow Discharge-Optical Emission Spectroscopy (GD-OES)).

Fracture Toughness—Fracture toughness value ($K_{1C}$) is measured by chevron notched short bar (CNSB) method disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). The ($K_{1C}$) is measured on a non-ion exchanged glass-based article. The test method does not work well on ion-exchanged articles. So, for an ion-exchanged glass-based article, the $K_{1C}$ can be measured on a non-ion-exchanged glass-ceramic article having a composition and crystalline phase assemblage equivalent to that at the center (half thickness) of the ion-exchanged glass-ceramic article, which is expected to correlate to the pre-ion exchange composition. The composition of the center of an ion-exchanged glass-ceramic article can be determined by microprobe by performing a line scan from surface to surface and determining the composition at the center and then determining the crystalline phase assemblage at the center from x-ray diffraction. Fracture toughness measurements on non-ion exchanged articles are expected to correlate well with the fracture toughness of the corresponding ion-exchanged article.

Glass-Based—As used herein, the terms "glass-based article" and "glass-based substrates" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %).

Integrated Central Tension—As used herein, integrated central tension (ICT) refers to the area of the central tension region of a stress profile across the entire thickness of an ion-exchanged substrate.

Integrated Compressive Stress—As used herein, integrated compressive stress (ICS) refers to the area of the compressive regions of a stress profile across the entire thickness of an ion exchanged substrate. In general, any compressive stress in an article is balanced by an equal amount of tension elsewhere in the article. As such, absent external forces or localized asymmetry, integrated compressive stress equals integrated central tension across a given stress profile.

Ion Exchange Process—Ion exchange processes are typically carried out by immersing a glass-based substrate in a molten salt bath (or two or more molten salt baths) containing the larger ions to be exchanged with the smaller ions in the glass-based substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOC and CS of the glass-based article that results from strengthening. By way of example, ion exchange of glass-based substrates may be achieved by immersion of the glass-based substrates in at least one molten bath containing a salt such as, but not limited to, nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass thickness, bath temperature and glass (or monovalent ion) diffusivity. However, temperatures and immersion times different from those described above may also be used.

Knee Stress—Knee stress (CSk) is a parameter used to describe a two-slope stress profile. A two-slope stress profile has a surface "spike" in stress, where stress decreases relatively rapidly with depth, and a "tail" beneath the spike, where stress decreases relatively slowly with depth. CSk is the stress at an asymptotic extrapolation of the spike and tail regions.

Stress Profile—A "stress profile" is stress with respect to position of a glass-based article or any portion thereof. A compressive stress region extends from a first surface to a depth of compression (DOC) of the article, where the article is under compressive stress. A central tension region extends from the DOC to include the region where the article is under tensile stress. The stress profiles described herein were measured via a combination of refractive near field and Orihara FSM-6000 LE for surface stress.

Substantial—The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

While various embodiments have been described in detail relative to certain illustrative and specific embodiments thereof, the present disclosure should not be considered limited to such, as numerous modifications and combinations of the disclosed features are envisioned without departing from the scope of the following claims.

Overview

Disclosed herein is a chemically strengthened glass-based article with a complex 3D geometry and non-uniform thickness. An adhesive is used to bond two or more ion-exchanged glass-based plates together to achieve the desired shape.

In some embodiments, the adhesive has an adhesive strength sufficiently high to avoid failure under the normal operating conditions for consumer hand-held devices such as smart phones and tablets, but sufficiently low to prefer a delamination failure mechanism over a glass or glass-ceramic breakage failure mechanism. The adhesive is preferably, but not necessarily, optically clear adhesive (OCA). Using OCA will minimize or eliminate the presence of a visible joint where parts are adhered, which is aesthetically undesirable.

Compared to machining, such bonding is lower cost, quicker, causes less environmental issues, and has lower energy consumption. Bonding can be performed at room temperature and does not need a clean-room environment.

In addition, using adhesive to bond separate parts allows the parts being adhered to have separate characteristics. For example, the parts can be made of different materials and/or have different stress profiles. The parts can then be separately engineered to address the types of failure mechanisms most likely to affect the specific part. Such optimization is not possible with a monolithic machined part that, by its nature, is made of a single material without variable composition and that is run through any ion exchange process as a single piece. However, the different bonded parts may also simply be the same material with the same stress profile.

Specific Geometries

In some embodiments, an article comprises a first plate made of a first chemically-strengthened glass-based material bonded with an adhesive to a smaller second plate made of a second chemically-strengthened transparent glass-based material. The result is a planar substrate with a raised portion, as illustrated in FIG. 1. The raised portion might be useful, for example, to house part of a camera assembly in a hole formed therein. The plates are not necessarily rectangles as shown in FIG. 1. For example, the plates may have rounded corners as is typical in many consumer electronic devices, or a completely different shape, for example a circle or oval for the raised portion.

With reference to FIG. 1, in some embodiments an article 100 is provided. The article includes a first plate 110 bonded to a second plate 120 with adhesive 130. Adhesive 130 is most clearly visible as a discrete layer in FIG. 6. Second plate 120 has a smaller area than first plate 110 and fits entirely within first plate 110. First plate 110 has a length L, a width W, and a thickness T. Second plate 120 has a length L', and width W' and a thickness T'. Overall article 100 appears as a planar substrate corresponding to plate 110 with a raised portion corresponding to plate 120.

Figure 2:
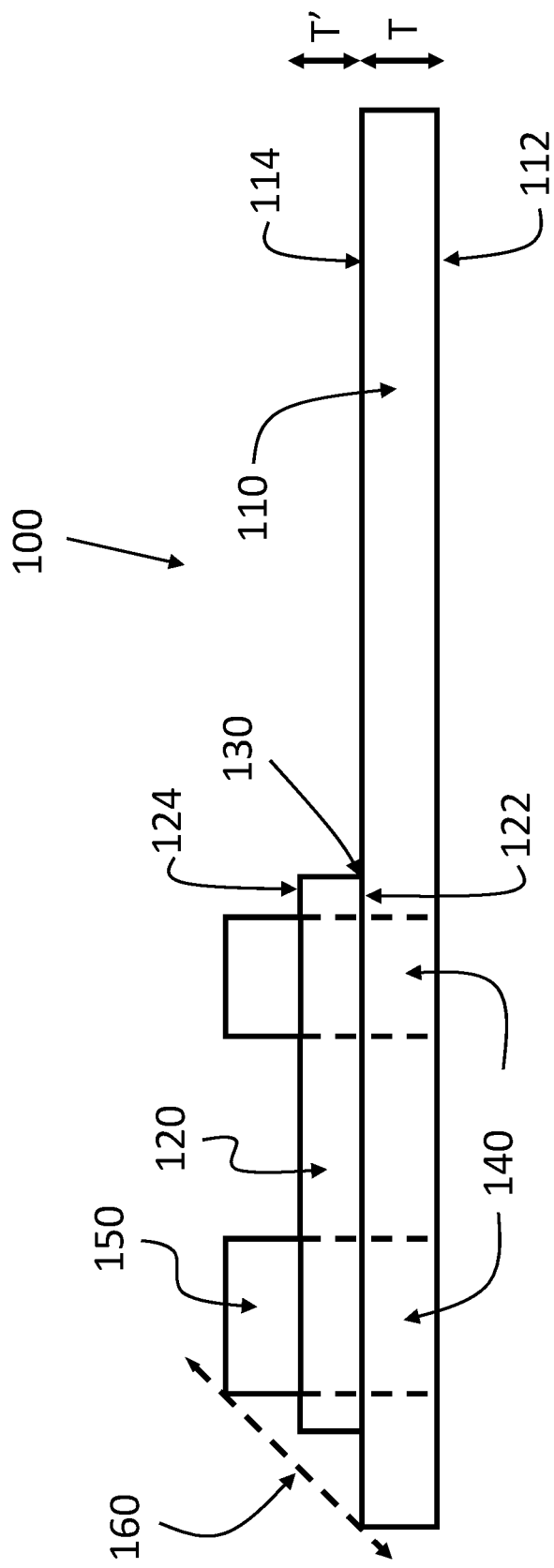
FIG. 2 illustrates an article having a planar substrate with a raised portion having holes and parts of a camera assembly.

FIG. 2 shows a side view of article 100 of FIG. 1, with the addition of holes and parts of a camera assembly. FIG. 2 illustrates a first major surface 112 and a second major surface 114 of first plate 110, where first major surface 112 opposes second major surface 114, separated by distance T. FIG. 2 also illustrates first major surface 122 and a second major surface 124 of second plate 120, where first major surface 122 opposes second major surface 124, separated by distance T'. Holes 140 extend through first plate 110, adhesive layer 130 and second plate 120. Camera assemblies 150 (or parts of camera assemblies) are at least partially disposed within holes 140, and protrude from second major surface 124. Line 160 illustrates how, for certain geometries, camera assemblies 150 and first plate 110 may provide some protection against drop events to second plate 120, such that second plate is less likely than first plate 110 to experience a drop impact. But, in other geometries, second plate 120 may be more likely than first plate 110 to experience a drop impact. The materials and stress profiles of first plate 110 and second plate 120 can be separately and independently selected for properties appropriate to the failure mechanisms most likely to be relevant to the individual plate.

Stress Profiles

Figure 3:
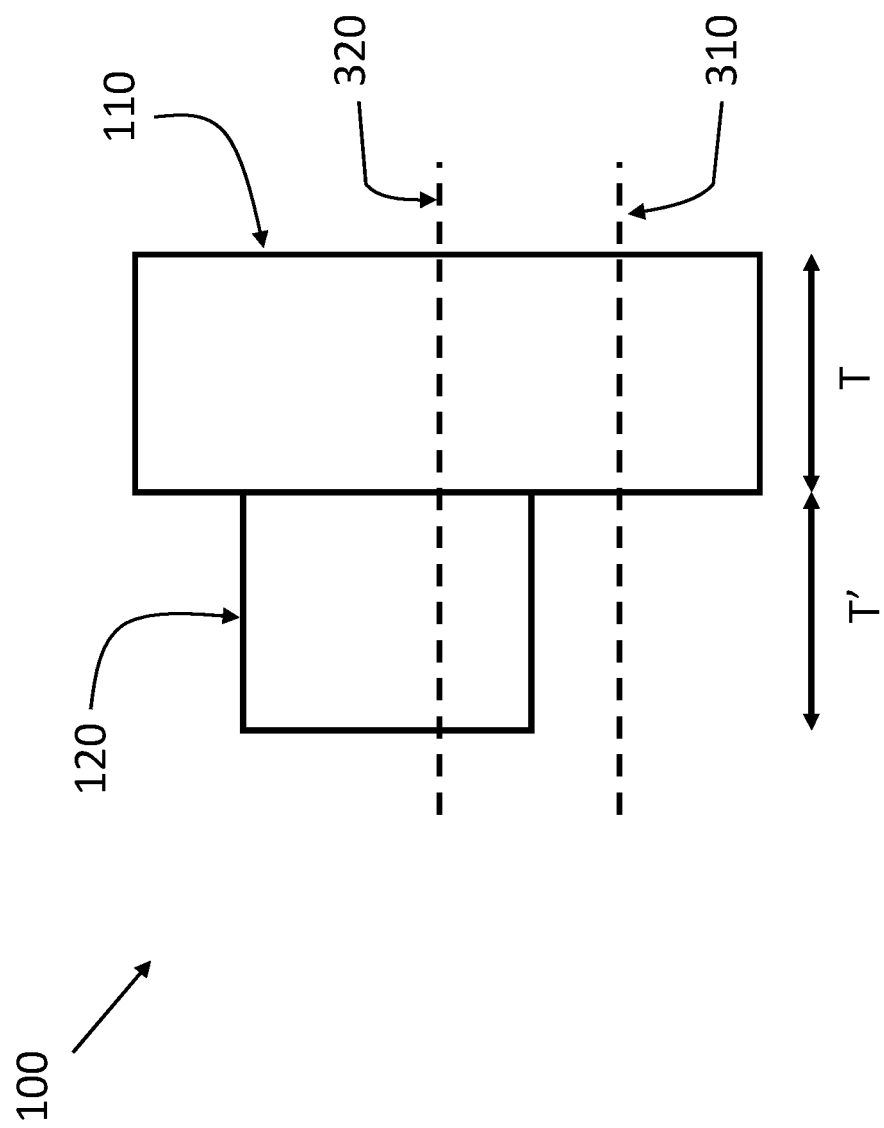
FIG. 3 illustrates an article having a planar substrate with a raised portion formed by fusing two plates.

FIG. 3 shows a comparative example of article 100, where first plate 110 is fused to second plate 120, without the presence of adhesive layer 130. The temperatures needed to achieve such fusion will typically allow ions to diffuse within materials, such that any stress profile present, and its associated favorable properties, will be degraded. So, any stress profile imparted to article 100 of FIG. 3 should be imparted after fusion. As a result, the entire article 100 is submerged into the IOX bath, which constrains differences in the stress profiles that can be achieved in the different plates (plate 110 and plate 120). Sample 1 was fabricated in accordance with the geometry of FIG. 3.

Figure 4:
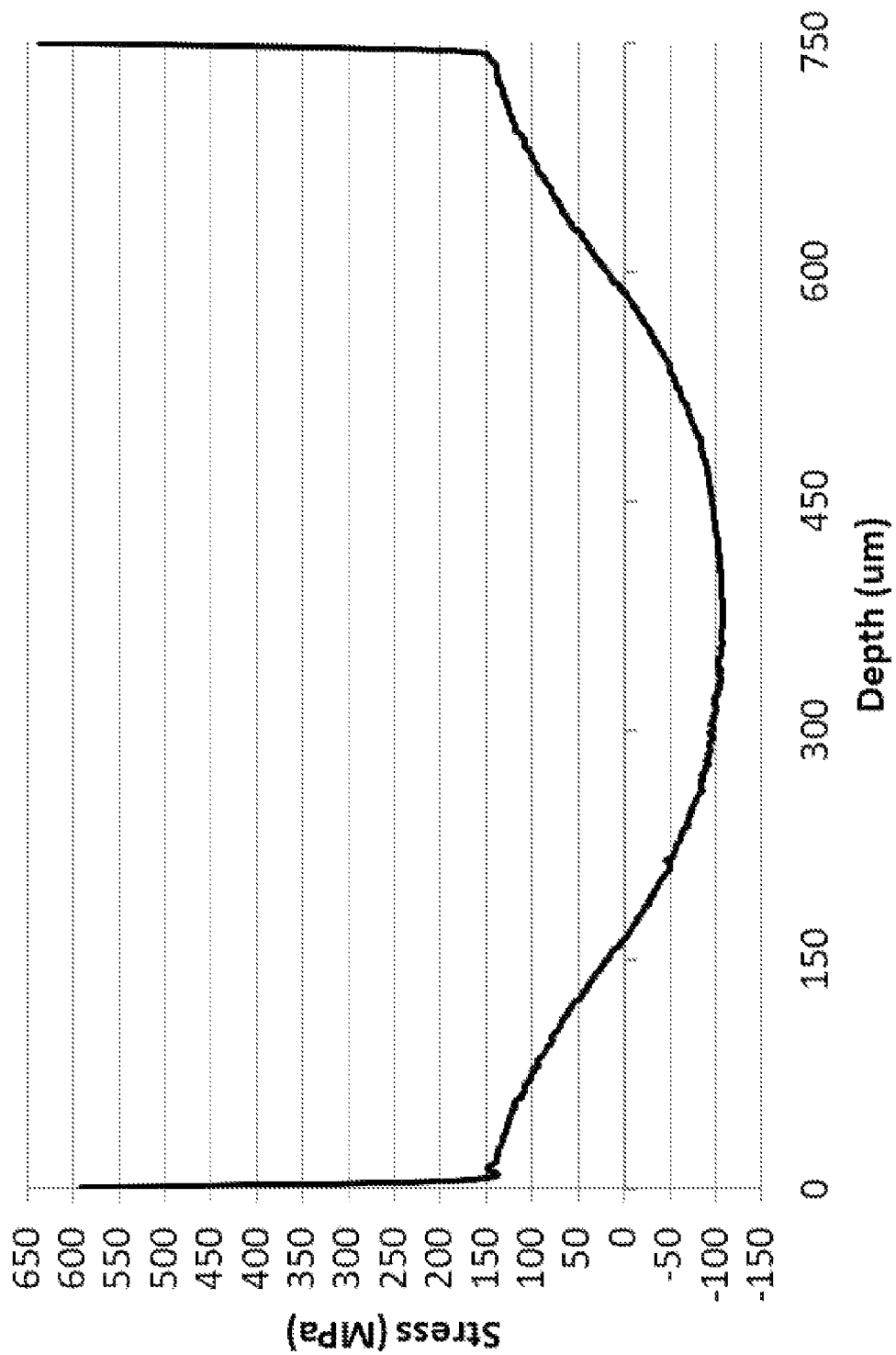
FIG. 4 illustrates a stress profile for article of FIG. 3, taken through a part of the article that does not include the raised portion.
Figure 5:
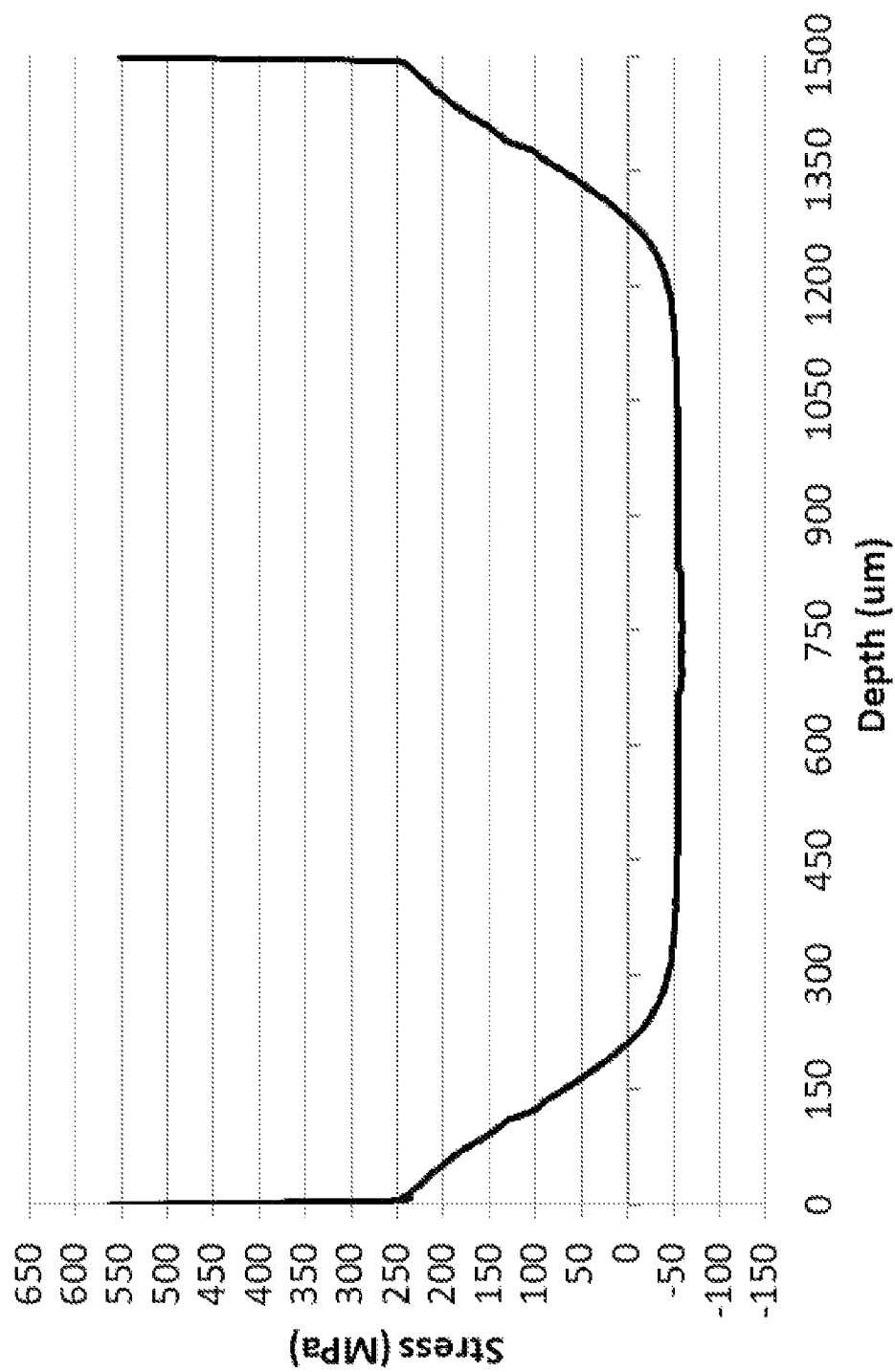
FIG. 5 illustrates a stress profile for article of FIG. 3, taken through a part of the article that includes the raised portion.

FIG. 4 shows an example of a stress profile taken along line 310 of Sample 1. FIG. 3. FIG. 5 shows an example of a stress profile taken along line 320 of Sample 1.

Figure 6:
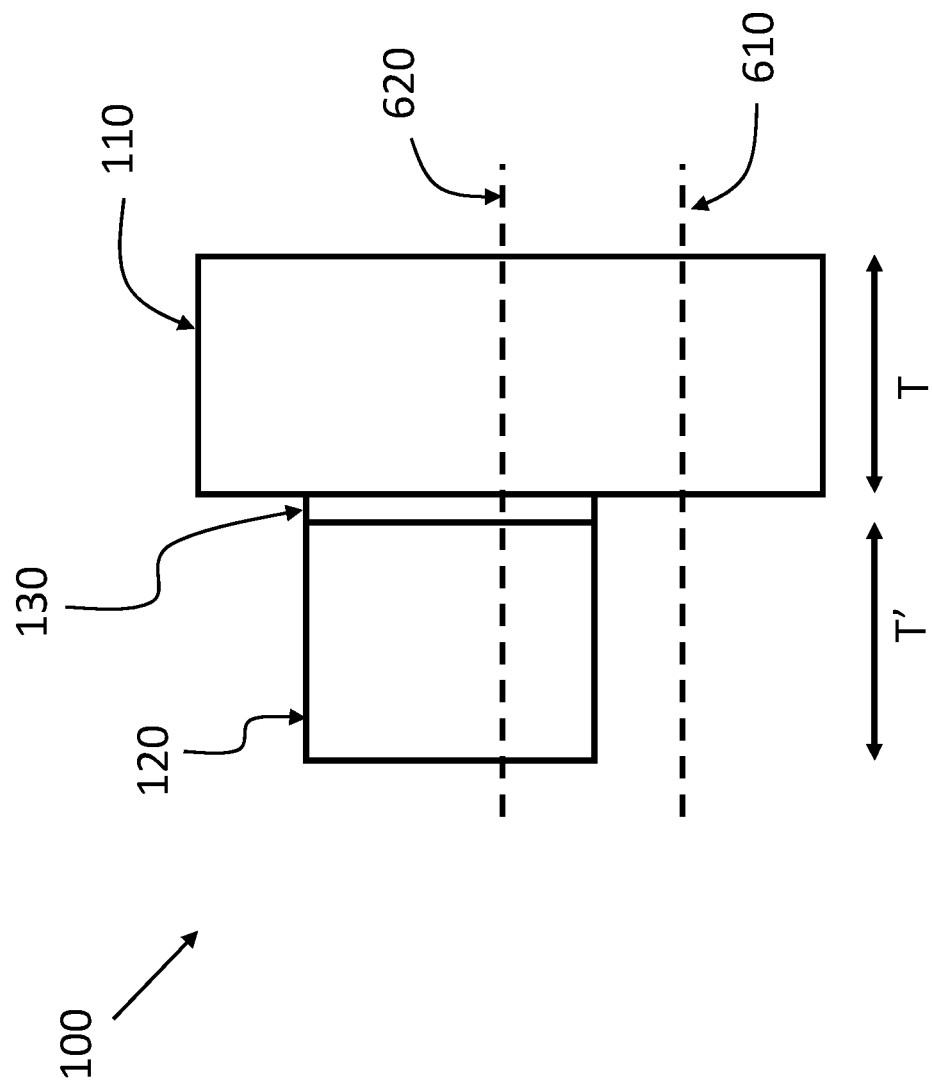
FIG. 6 illustrates an article having a planar substrate with a raised portion formed by adhering two plates.

FIG. 6 shows an example of article 100, where first plate 110 is adhered to second plate 120 by adhesive layer 130. Such adhesion can be achieved at a temperature sufficiently low, including at room temperature (25 C), that any stress profiles present in plate 110 and plate 120 will not degrade. So, stress profiles can be separately and independently imparted to plate 110 and plate 120. And, unlike the example of FIG. 3, article 100 of FIG. 4 has compressive stress along the interface between plate 110 and plate 120. Samples 2 through 9 were were fabricated in accordance with the geometry of FIG. 3.

Figure 7:
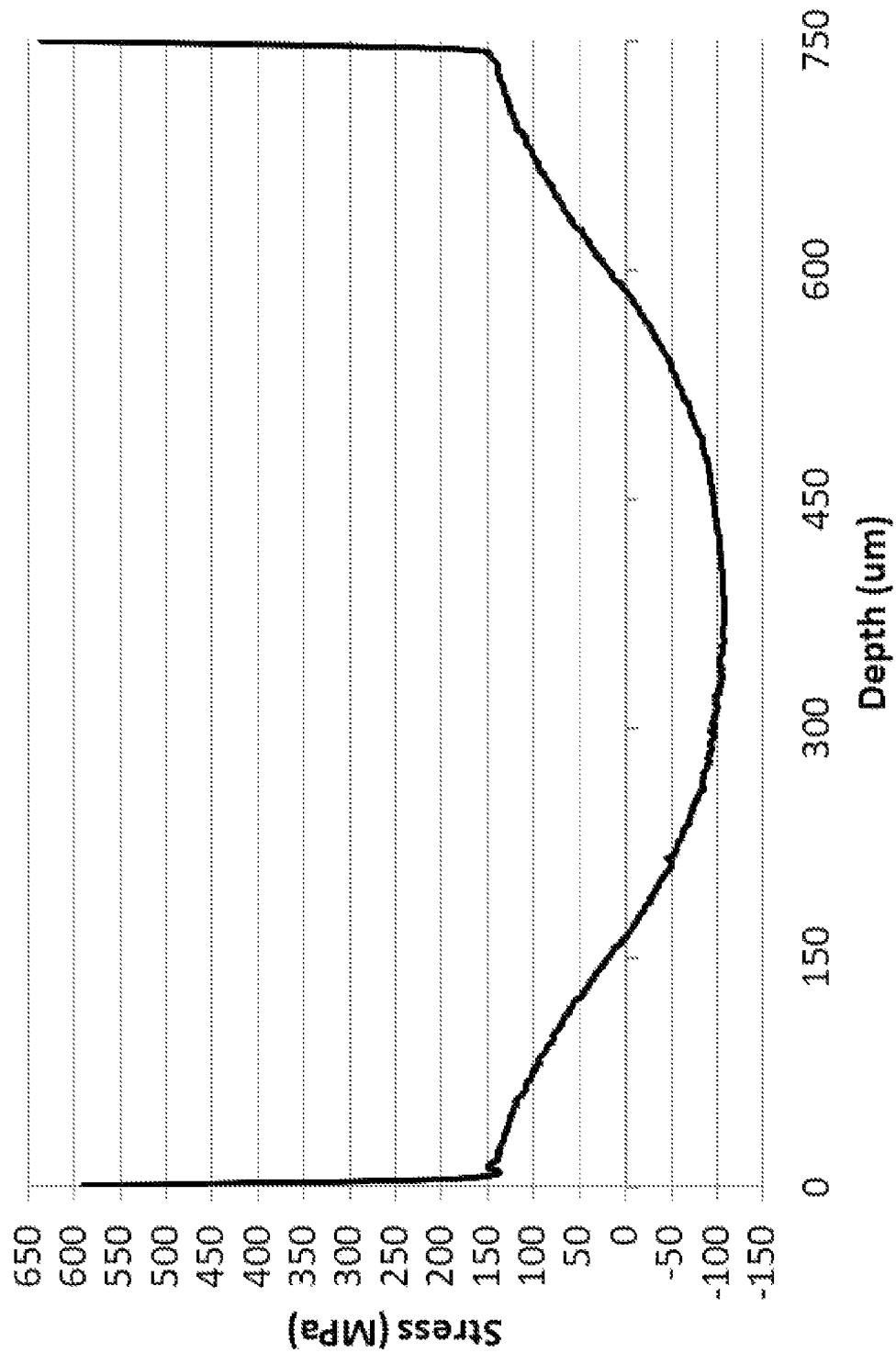
FIG. 7 illustrates a stress profile for article of FIG. 6, taken through a part of the article that does not include the raised portion.
Figure 8:
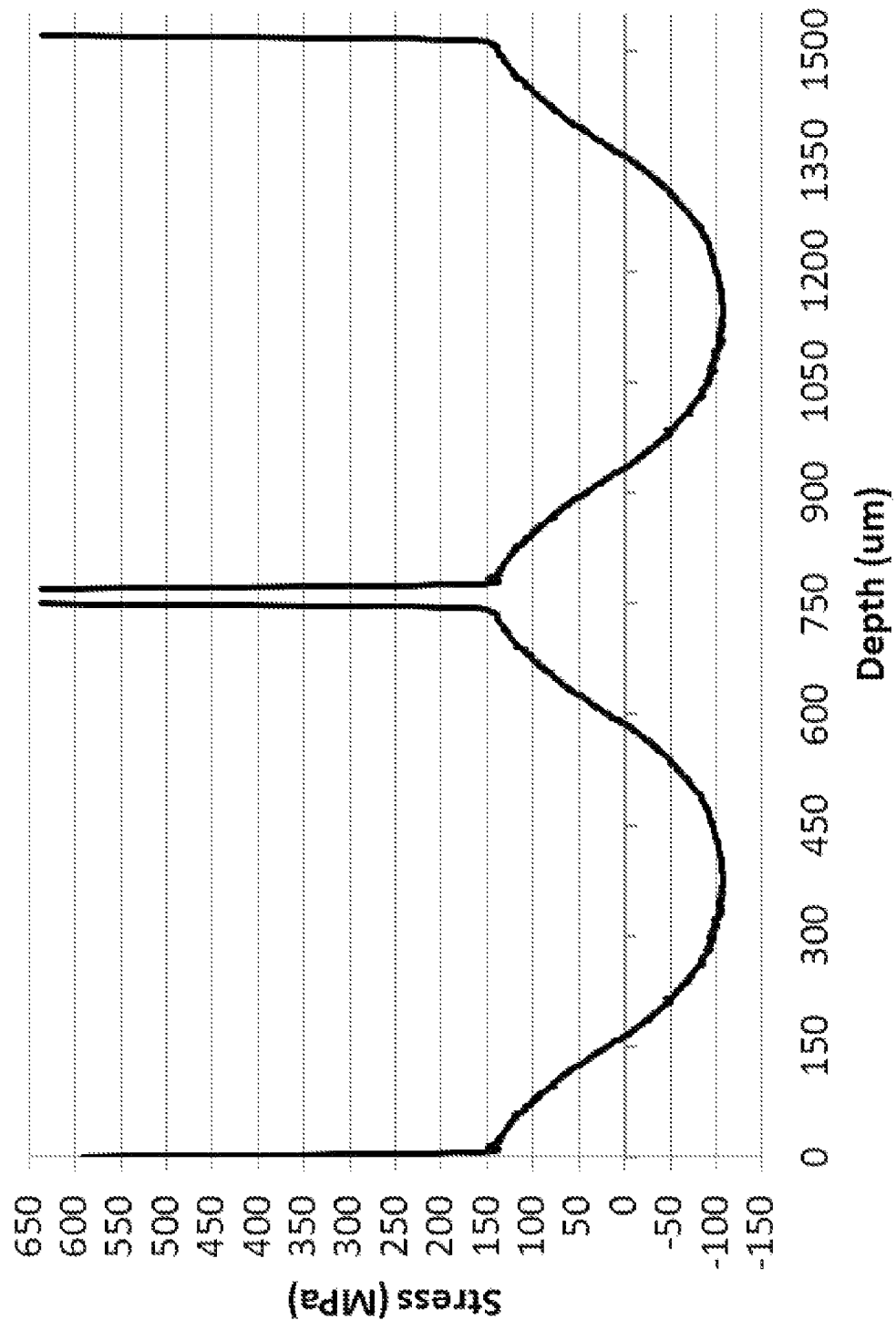
FIG. 8 illustrates a stress profile for article of FIG. 6, taken through a part of the article that includes the raised portion.

FIG. 7 shows an example of a stress profile taken along line 610 of Sample 2, and FIG. 8 shows an example of a stress profile taken along line 620 of Sample 2.

Three Point Bend Test and Failure Modes

Figure 9:
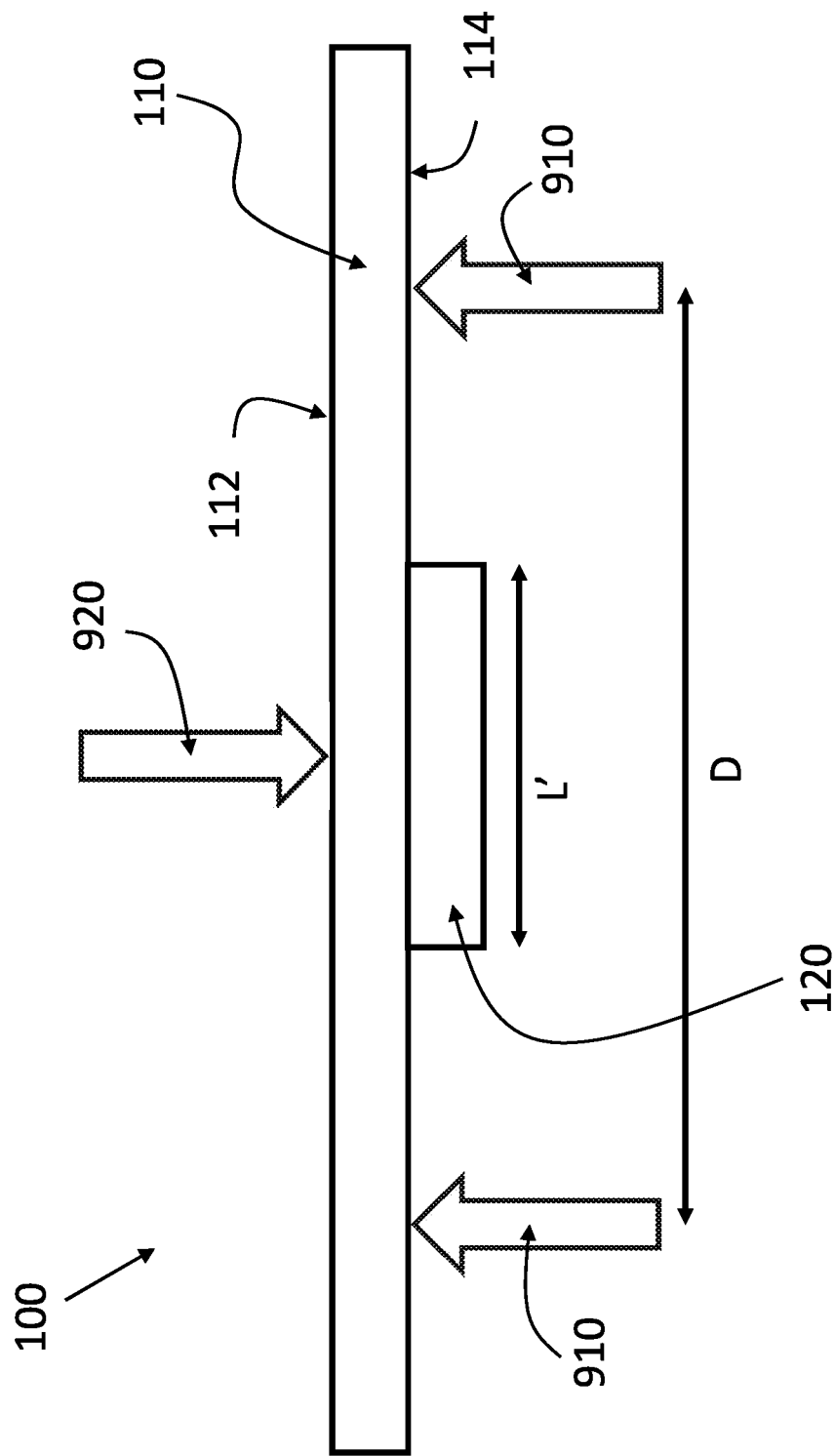
FIG. 9 illustrates a three-point bend test being performed on the article of FIG. 1.

FIG. 9 shows article 100 being subjected to a three-point bend test. Arrows 910 represent two of the three points at which force is applied, in this case by supporting plate 110 on second major surface 114 at points equidistant from plate 120, with plate 120 facing down. Then, a downward force is applied at the center of plate 120, on first surface 112 of plate 110, represented by arrow 920. Stress vs. displacement is measured as increasing force is applied at arrow 920, and a correspondingly increasing displacement occurs. Arrows 920, and the corresponding supports used for the three-point bend test, are separated by a distance D.

Relevant parameters measured by the three-point bend test described herein include the failure mode, and the displacement that can be sustained prior to failure. Two primary failure modes are expected, depending on the relationship between the failure strength of the first glass-based material of plate 110, the failure strength of second glass-based material 120, and the bond strength of the adhesive of adhesive layer 130.

One failure mode is delamination, where plate 110 delaminates from plate 120 at adhesive layer 130. This failure mode occurs when the bond strength of the adhesive of adhesive layer 130 is lower than both the failure strength of the glass-based material of first glass-based material of plate 110 and the failure strength of the glass-based material of plate 120. This failure mode is preferred, because delamination minimizes or avoids the presence of broken, sharp, and undesirable glass-based material shards or fragments.

Another failure mode is breakage of plate 110 or plate 120. This failure mode occurs when the bond strength of the adhesive of adhesive layer 130 is higher than either the failure strength of the first glass-based material of plate 110 and the failure strength of second glass-based material 120. In that case, the plate with the lower failure strength will break, potentially resulting in undesirable shards or fragments.

Observation of which failure mode occurs allows one to determine whether the adhesive favorably has a bond strength lower than both the failure strength of the glass-based material of first glass-based material of plate 110 and the failure strength of the glass-based material of plate 120. This measurement sets an upper bound on the bond strength of the adhesive if favorable failure mechanisms are desired.

The displacement that can be sustained prior to failure is another relevant parameter. This displacement provides another measure of the bond strength of the adhesive, in this case a measure appropriate for a lower bound on the bond strength of the adhesive that should be met to avoid delamination that occurs too easily. Displacement per span is a way to measure the bond strength in a way that normalizes for the testing geometry. Displacement per span is the observed displacement divided by distance D. For the specific testing apparatus used herein, distance D was 60 mm. It is expected that the displacement achievable by a given sample would scale linearly with increasing D. So, a sample displaced 1 mm with a span of 60 mm is expected to experience roughly the same stresses and strains in the relevant parts of the sample as the same sample displaced 1.5 mm with a span of 60 mm.

The samples tested herein had plates 120 with a length and width of 35 mm. It is believed that changing span within a reasonable range will not affect observed failure mode or displacement per span at failure. But, to be specific about how to test, unless otherwise specified, the three points of the three point bend test should be arranged along the longest of L' or W' of plate 120, and the span (distance D) should be (60/35) or 1.714 times the longest of L' and W', which works out to a span of 60 mm for a plate 120 with L' and W' equal to 35 mm. If the sample geometry does not allow for such a span, for example if the span calculated as describe results in a support outside of the boundaries of plate 110, a span as close as possible to the calculated value should be used.

Figure 10:
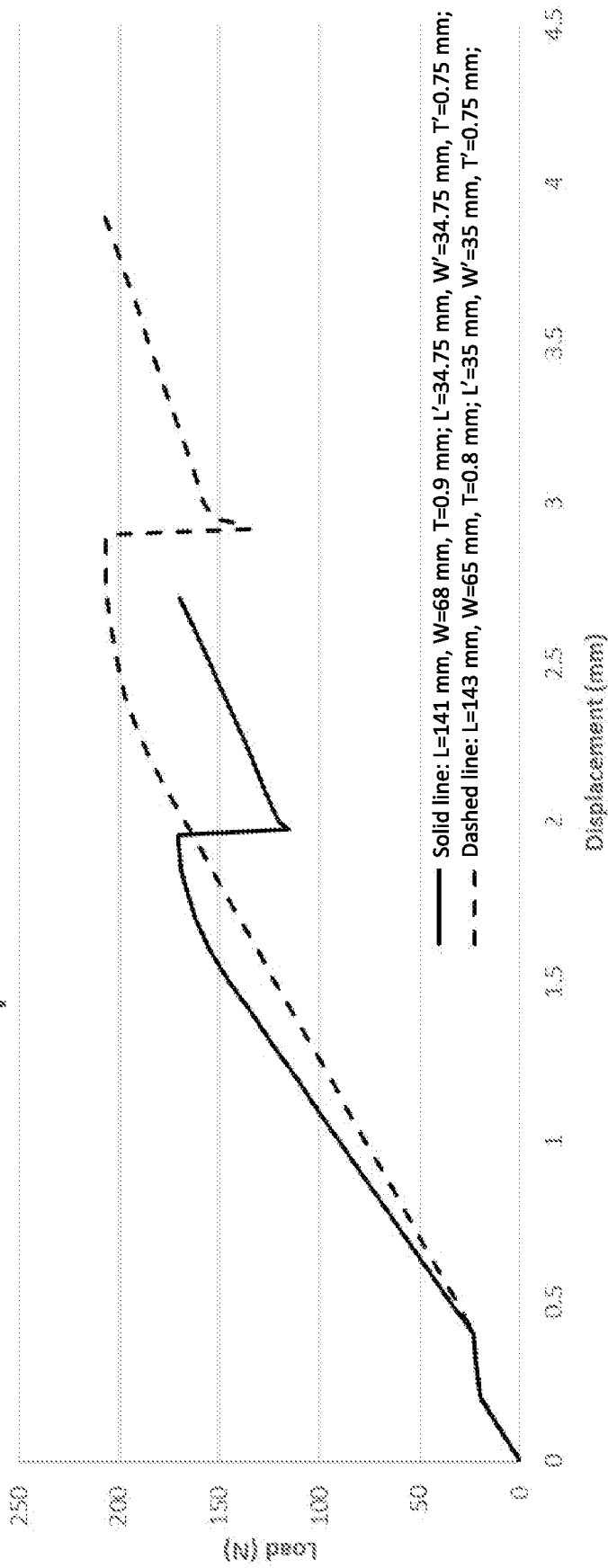
FIG. 10 illustrates load vs. displacement data obtained from a three-point bend test.

FIG. 10 shows 3-point bend test results for 2 samples (Samples 3 and 4) having glass bonded to glass, with different first plate thickness, tested with a span of 60 mm:

Sample 3 (Solid line): First Plate dimensions: L=141 mm, W=68 mm, T=0.9 mm; Second Plate dimensions: L'=34.75 mm, W'=34.75 mm, T'=0.75 mm;

Sample 2 (Dashed line): First Plate dimensions: L=143 mm, W=65 mm, T=0.8 mm; Second Plate dimensions: L'=35 mm, W'=35 mm, T'=0.75 mm;

Sample 3 and Sample 4 were both observed to fail by delamination, indicating that the adhesive bond strength was lower than the failure strength of both plates. Sample 3 failed at a displacement of 1.9 mm, with a span of 60 mm. So, the displacement per 35 mm of span was 1.11 mm (1.9*(35/60)), which is larger than 1 mm/35 mm displacement, indicating a bond strength suitable for use in commercial electronic devices. Sample 4 failed at a displacement of 2.8 mm, with a span of 60 mm. So, the displacement per 35 mm of span was 1.63 mm (2.8*(35/60)), which is also larger than 1 mm/35 mm displacement, indicating a bond strength suitable for use in commercial electronic devices.

Figure 11:
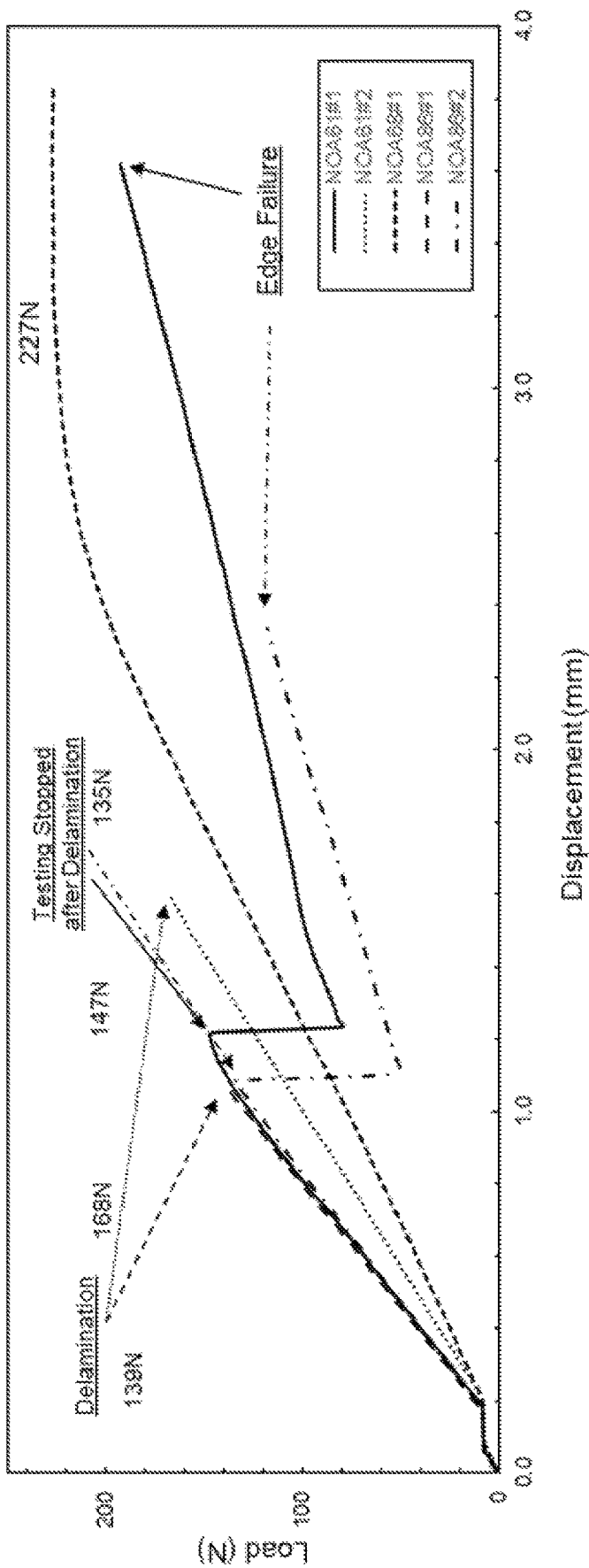
FIG. 11 illustrates more load vs. displacement data obtained from a three-point bend test.

FIG. 11 shows 3-point bend test results for 5 samples (Samples 5 through 9) having glass-ceramic bonded to glass-ceramic, using different adhesives and variable thickness, tested with a span of 60 mm.

Each of Samples 5, 6, 8 and 9 were observed to fail by delamination. Sample 7 failed by breakage. The span used to test was 60 mm. So, any samples failing at a displacement equal to or greater than 1.71 mm will meet the criteria of allowing a displacement of at least 1 mm/35 mm span. Sample 7 meets this criteria. Samples 5, 6, 8 and 9 do not.

It should be noted that Sample 7 uses the same adhesive, NOA 68, that was used for Samples 3 and 4.

Adhesives

Table 1 shows properties for adhesives used in the examples herein. These properties were obtained from Norland product literature. The adhesives were OCA (optically clear adhesives), available from Norland Products Inc. of Cranbury, NJ, and identifiable by the NOA ("Norland Optical Adhesive") code used herein. Other adhesives may also be used to effectuate embodiments of the invention.

TABLE 1

| Product | Viscosity at 25° C. | Refractive Index | Modulus PSI | Tensile PSI | Elongation at Failure | Shore D Hardness |
|---|---|---|---|---|---|---|
| NOA 68 | 5000 CPS | 1.54 | 20000 | 2500 | 80% | 60 |
| NOA 61 | 300 CPS | 1.56 | 150000 | 3000 | 38% | 85 |
| NOA 86 | 200 CPS | 1.55 | 360000 | 7800 | 2.8% | 75 |

Each of the adhesives was UV curable. As OCA, these adhesives were all optically clear. Depending on the desired aesthetics, adhesives that are not optically clear may be used. Other curing mechanisms may be used, including visible light and thermal.

Sample Geometry and Composition

Table 2 shows the geometry, composition and adhesive used for the Samples described herein. Samples 1 through 9 were actually fabricated and tested. Samples 10 and 11 are prophetic, but are expected to show results similar to those observed for Samples 2, 3 and 7.

TABLE 2

| sample | L × W × T (mm) | L' × W' × T' (mm) | Plate 1 comp | Plate 2 comp | adhesive |
|---|---|---|---|---|---|
| 1 | 130 × 76 × 0.8 | 35 × 35 × 0.75 | A (glass) | A (glass) | None (fused) |
| 2 | 130 × 76 × 0.8 | 35 × 35 × 0.75 | A (glass) | A (glass) | NOA 68 |
| 3 | 143 × 65 × 0.8 | 35 × 35 × 0.75 | A (glass) | A (glass) | NOA 68 |
| 4 | 141 × 68 × 0.9 | 34.75 × 34.75 × 0.75 | A (glass) | A (glass) | NOA 68 |
| 5 | 143 × 65.2 × 0.75 | 35 × 35 × 0.8 | B (g-c) | B (g-c) | NOA 61 |
| 6 | 143 × 65.2 × 0.75 | 35 × 35 × 0.8 | B (g-c) | B (g-c) | NOA 61 |
| 7 | 143 × 65.2 × 0.75 | 35 × 35 × 0.8 | B (g-c) | B (g-c) | NOA 68 |
| 8 | 143 × 65.2 × 0.75 | 35 × 35 × 0.8 | B (g-c) | B (g-c) | NOA 86 |
| 9 | 143 × 65.2 × 0.75 | 35 × 35 × 0.8 | B (g-c) | B (g-c) | NOA 86 |
| 10 | 130 × 76 × 0.8 | 35 × 35 × 0.75 | A (glass) | B (g-c) | NOA 68 |
| 11 | 130 × 76 × 0.8 | 35 × 35 × 0.75 | B (g-c) | A (glass) | NOA 68 |

Composition A is a glass disclosed in US 2019/0300422, which is incorporated by reference. Composition A is Example BT of US 2019/0300422, Table 1. Composition B is a glass-ceramic disclosed in US 2020-0017399, which is incorporated by reference, as Example 10 of Table 1. The specific composition is less important for embodiments described herein than the yield strength and other desirable properties. Fracture toughness is one parameter helps improve yield strength, and how strong an adhesive can be used while still favoring the delamination failure mode over fracture. It should be noted that Applicant is not seeking to claim high fracture toughness materials per se, but is rather providing guidance to use fracture toughness, a well-known and widely reported material property, as a criteria for selecting among known materials for use in some embodiments described herein.

In some embodiments, the fracture toughness of any glass-ceramic plates in the article is in a range from 1.0 MPa$\sqrt{}$m to 2.0 MPa$\sqrt{}$m, 1.1 MPa$\sqrt{}$m to 2.0 MPa$\sqrt{}$m, 1.2 MPa$\sqrt{}$m to 2.0 MPa$\sqrt{}$m, 1.3 MPa$\sqrt{}$m to 2.0 MPa$\sqrt{}$m, 1.4 MPa$\sqrt{}$m to 2.0 MPa$\sqrt{}$m, 1.5 MPa$\sqrt{}$m to 2.0 MPa$\sqrt{}$m, 1.0 MPa$\sqrt{}$m to 1.9 MPa$\sqrt{}$m, 1.1 MPa$\sqrt{}$m to 1.9 MPa$\sqrt{}$m, 1.2 MPa$\sqrt{}$m to 1.9 MPa$\sqrt{}$m, 1.3 MPa$\sqrt{}$m to 1.9 MPa$\sqrt{}$m, 1.4 MPa$\sqrt{}$m to 1.9 MPa$\sqrt{}$m, 1.5 MPa$\sqrt{}$m to 1.9 MPa$\sqrt{}$m, 1.0 MPa$\sqrt{}$m to 1.8 MPa$\sqrt{}$m, 1.1 MPa$\sqrt{}$m to 1.8 MPa$\sqrt{}$m, 1.2 MPa$\sqrt{}$m to 1.8 MPa$\sqrt{}$m, 1.3 MPa$\sqrt{}$m to 1.8 MPa$\sqrt{}$m, 1.4 MPa$\sqrt{}$m to 1.8 MPa$\sqrt{}$m, 1.5 MPa$\sqrt{}$m to 1.8 MPa$\sqrt{}$m, and all ranges and subranges therebetween. In some embodiments, the fracture toughness of the glass-ceramic article is greater than or equal to 1.0 MPa$\sqrt{}$m, 1.1 MPa$\sqrt{}$m, 1.2 MPa$\sqrt{}$m, 1.3 MPa$\sqrt{}$m, 1.4 MPa$\sqrt{}$m, 1.5 MPa$\sqrt{}$m, 1.6 MPa$\sqrt{}$m, 1.7 MPa$\sqrt{}$m, 1.8 MPa$\sqrt{}$m, or 1.9 MPa$\sqrt{}$m. US 2020-0017399, which is incorporated by reference, provides examples of suitable materials meeting these criteria.

In some embodiments, the glass compositions exhibit a fracture toughness value of at least 0.75, such as at least 0.76, at least 0.77, at least 0.78, at least 0.79, at least 0.80, at least 0.81, at least 0.82, at least 0.83, at least 0.84, at least 0.85, at least 0.86, at least 0.87, at least 0.88, at least 0.89, at least 0.90, at least 0.91, at least 0.92, at least 0.93 at least 0.94, at least 0.95, or at least 0.96 MPa$\sqrt{}$m. In embodiments, the glass compositions exhibit fracture toughness greater than or equal to 0.75 to less than or equal to 1.00, such as from greater than or equal to 0.76 to less than or equal to 0.99, from greater than or equal to 0.77 to less than or equal to 0.98, from greater than or equal to 0.78 to less than or equal to 0.97, from greater than or equal to 0.79 to less than or equal to 0.96, from greater than or equal to 0.80 to less than or equal to 0.95, from greater than or equal to 0.81 to less than or equal to 0.94, from greater than or equal to 0.82 to less than or equal to 0.93, from greater than or equal to 0.83 to less than or equal to 0.92, from greater than or equal to 0.84 to less than or equal to 0.91, from greater than or equal to 0.85 to less than or equal to 0.90, from greater than or equal to 0.86 to less than or equal to 0.89, or from greater than or equal to 0.87 to less than or equal to 0.88, and all ranges and sub-ranges between the foregoing values, where values are in MPa$\sqrt{}$m.

Fracture toughness is useful in resisting overstress failure. As explained elsewhere herein, overstress failure is of particular concern for the second, smaller plate described herein. Glass-ceramic materials tend to have higher fracture toughness than glass. So, in some embodiments, it is preferable to make the second plate of glass-ceramic. Glass may be less expensive than glass-ceramic, and suitable for use in less demanding parts of the article. So, in some embodiments it is preferable to make the first plate of glass and the second plate of glass-ceramic. But, various combinations of glass and glass-ceramic, as well as various combinations of fracture toughness including fracture toughness outside the preferred ranges described herein, may be used depending on the overall resistance to failure by various modes desired from the glass-based article.

Using different materials with different fracture toughness, different stress profiles, and different cost for the first and second plates is one example of how embodiments described herein enable the tailoring of article properties in ways not previously achievable. In some embodiments, it may be desirable to tailor the first plate to resist one type of failure mechanism particularly well, and the second plate to resist a second type of failure mechanism particularly well, perhaps at the cost of less resistance to the first failure mechanism. In some embodiments, it may be desirable to tailor one of the first or second plate to have resistance superior to the other plate across multiple failure mechanisms, but perhaps at the cost of added expense for the specific plate (but not the whole article). In some embodiments, the first and second plate may be the same material, and the stress distribution illustrated by FIG. 6, FIG. 7 and FIG. 8 provides advantageous properties such as high integrated stress.

Plate Fabrication

Samples 1 through 9 were fabricated as follows: glass sheet or glass-ceramic sheet was finished to the dimensions specified in Table 2, using industry-standard techniques.

If one or more holes are desired, such holes are preferably introduced prior to the next step, ion exchange, to avoid an exposed edge in the central tension region of the glass. However, if any such edge is well-protected or subsequently further strengthened, such holes may be introduced after ion exchange.

Ion Exchange

For Samples 2 through 9, the first and second plates were, as separate pieces, chemically strengthened by ion exchange using the conditions shown in Table 3:

TABLE 3

| KNO3 (wt %) | % NaNO3 (wt %) | % LiNO3 (wt %) | % Silicic acid | Time (hr) | Temp (deg C.) |
|---|---|---|---|---|---|
| 86.2 | 11.8 | 2 | 0.5 | 8.4 | 450 |

After chemical strengthening by ion exchange process (IOX), the first and second plates of samples 2 through 9 were bonded with the adhesive specified in Table 1 using the following process:
1. Clean the interfaced with IPA wipe.
2. Place the part A in a steady position or alignment fixture.
3. Apply OCA on the turret part and carefully place on the glass plate.
4. Position the turret.
5. Apply pressure (1-2 lb weight) on the turret.
6. Wait for 30-60 seconds until all the bubbles exit from the turret edges.
7. Remove excessive adhesive from part A as much as possible.
8. UV cure step 1: 15 seconds: To make the adhesion firm enough to avoid sliding, and soft enough for easy remove of the aligner and cleaning. After the cure, the aligner is carefully removed. Then The excessive OCA is cleaned from the aligner and glass surface with IPA and wipe.
9. UV cure step 2: 45 seconds: To firm the adhesion on the cleaned sample.
10. Age for 12 hrs at 50° C. or 1 week at room temperature.

For sample 1, the plates were fused prior to chemical strengthening, and were subsequently chemically strengthened according to the conditions of Table 3.

Stress profiles were measured for Samples 1 and 2. These stress profiles are shown in FIG. 4 and FIG. 5, respectively. Stress parameters for Samples 1 and 2 are reflected in Table 4:

TABLE 4

| Composition A Thickness (mm) | CS (MPa) | DOL (um) | CSk (MPa) | DOC (um) | CT (MPa) | Integrated compressive stress if IOX'd after shaped by method 1 or 2. (MPa mm) | Integrated compressive stress IOX'd as separate pieces and adhesive bonded (MPa mm) |
| --- | --- | --- | --- | --- | --- | --- | --- |
| 1.5 | 644 | 4.7 | 237 | 211 | 59 | 56 | 64 |
| 0.75 | 646 | 5.4 | 151 | 164 | 102 | 32 | N/A |

The integrated compressive stress comparison between these two profiles shows a gain of 8 MPa mm of integrated compressive stress on the sample made by OCA (Sample 2) compared to the fused sample (Sample 1). This value is obtained by taking twice the value for the 0.75 mm thickness and comparing to the value for 1.5 mm thickness. The higher ICS of sample 2 is desirable because it increases yield strength.

Failure Mechanisms

The articles disclosed herein are useful, for example, for a phone housing where a camera is desired that has a large lens that does not fit within the thickness possible for other parts of the phone. The raised portion, with one or more holes present therein, can accommodate such a camera.

For such an article, it is believed that "overstress" is a failure mechanism of enhanced concern for the raised portion. Overstress is caused when the article is bent or flexed such that the raised portion is on the outward facing (convex) portion of the bend. In that case, the raised portion may experience tensile strain and stress higher than the rest of the device, because it is on the outermost portion of the curve formed by bending. One way to counter such overstress is to introduce a relatively large compressive stress into the raised portion. Overstress is of less concern for other parts of the article, because they experience less tensile strain and stress. So, it is desirable to engineer the raised portion to have a compressive stress that is large, either relative to the rest of the article or as an absolute value. Surface compressive stress $CS_S$ is the specific value that correlates best with ability to prevent failure due to overstress.

For the remainder of the article, i.e., not the raised portion, a drop event may be a failure mechanism of enhanced concern. In this case, DOC is the specific stress profile value that correlates best with the ability to prevent failure dur to drop.

Conclusion

While various embodiments have been described in detail relative to certain illustrative and specific embodiments thereof, the present disclosure should not be considered limited to such, as numerous modifications and combinations of the disclosed features are envisioned without departing from the scope of the following claims.

What is claimed is:

1. An article, comprising:
   a first plate made of a first chemically-strengthened transparent glass-based material, the first plate comprising:
     a first major surface opposing a second major surface;
     a thickness equal to or greater than 0.4 mm and less than or equal to 3.0 mm;
   a second plate made of a second chemically-strengthened transparent glass-based material, the second plate comprising:
     a first major surface opposing a second major surface;
     a thickness equal to or greater than 0.4 mm and less than or equal to 3.0 mm;
   a cured adhesive layer adhering a portion of the first major surface of the first plate to the second major surface of the second plate;
   wherein the second plate has an area equal to or less than 25% of the area of the first plate.

2. The article of claim 1, wherein the adhesive has a bond strength lower than the failure strength of the first chemically-strengthened transparent glass-based material and lower than the failure strength of the second chemically-strengthened transparent glass-based material.

3. The article of claim 1, wherein the adhesive has an adhesive bond strength sufficient to allow displacement of equal to or greater than 1 mm/35 mm span in a 3-point bend test before delamination.

4. The article of claim 1, wherein the length of the second plate is equal to or less than 0.5 of the length of the first plate, and the width of the second plate is equal to or less than 0.5 of the width of the first plate.

5. The article of claim 1, wherein:
   the first plate is rectangular in shape with a length of 60 mm to 180 mm, and a width of 50 mm to 120 mm;
   the second plate is rectangular in shape with a length of 10 mm to 45 mm, and a width of 10 mm to 45 mm.

6. The article of claim 1, wherein:
   the first plate is rectangular in shape with a length of 150 mm to 550 mm, and a width of 100 mm to 360 mm;
   the second plate is rectangular in shape with a length of 10 mm to 90 mm, and a width of 10 mm to 90 mm.

7. The article of claim 1, wherein the article is transparent, and the cured adhesive layer is made of a cured optically clear adhesive.

8. The article of claim 1, further comprising at least one hole extending through the first plate, the cured adhesive layer and the second plate.

9. The article of claim 8, further comprising a camera assembly disposed at least partially within the at least one hole and protruding from the second major surface of the second plate.

10. The article of claim 1, wherein each of the first and second chemically-strengthened transparent glass-based materials are independently selected from:
- a glass material having a fracture toughness equal to or greater than 0.75 MPa√m; and
- a glass-ceramic material having a fracture toughness equal to or greater than 1.0 MPa√m.

11. The article of claim 1, wherein:
the first plate is made of:
  (i) a chemically-strengthened glass material with a DOC equal to or greater than 0.09*t; or
  (ii) a chemically strengthened glass-ceramic material with a DOC equal to or greater than 0.09*t; and
the second plate is made of:
  (i) a chemically strengthened glass material having:
    a CS equal to or greater than 550 MPa; and
    a DOL equal to or greater than 4 microns; or
  (ii) a chemically strengthened glass-ceramic material having:
    a CS equal to or greater than 200 MPa; and
    a DOL equal to or greater than 4 microns.

12. The article of claim 1, wherein:
the first plate is made of:
  (iii) a chemically-strengthened glass material with a DOC equal to or greater than 0.09*t; or
  (iv) a chemically strengthened glass-ceramic material with a DOC equal to or greater than 0.09*t; and
the second plate is made of:
  (iii) a chemically strengthened glass material having:
    a CS equal to or greater than 600 MPa; and
    a DOL equal to or greater than 10 microns; or
  (iv) a chemically strengthened glass-ceramic material having:
    a CS equal to or greater than 200 MPa; and
    a DOL equal to or greater than 10 microns.

13. The article of claim 1, wherein the first chemically-strengthened transparent glass-based material and the second chemically-strengthened transparent glass-based material are both glass materials.

14. The article of claim 1, wherein the first chemically-strengthened transparent glass-based material and the second chemically-strengthened transparent glass-based material are both glass-ceramic materials.

15. The article of claim 1, wherein the first chemically-strengthened transparent glass-based material is a glass material, and the second chemically-strengthened transparent glass-based material is a glass-ceramic material.

16. The article of claim 1, wherein the first chemically-strengthened transparent glass-based material is a glass-ceramic material, and the second chemically-strengthened transparent glass-based material is a glass material.

17. The article of claim 1, wherein the first chemically-strengthened transparent glass-based material and the second chemically-strengthened transparent glass-based material are the same material.

18. The article of claim 1, wherein the first chemically-strengthened transparent glass-based material and the second chemically-strengthened transparent glass-based material are different materials.

19. A method of fabricating an article,
the article comprising:
a first plate made of a first chemically-strengthened transparent glass-based material, the first plate comprising:
  a first major surface opposing a second major surface;
  a thickness equal to or greater than 0.4 mm and less than or equal to 3.0 mm;
a second plate made of a second chemically-strengthened transparent glass-based material, the second plate comprising:
  a first major surface opposing a second major surface;
  a thickness equal to or greater than 0.4 mm and less than or equal to 3.0 mm;
a cured adhesive layer adhering a portion of the first major surface of the first plate to the second major surface of the second plate;
wherein the second plate has an area equal to or less than 25% of the area of the first plate;
the method comprising:
  ion-exchanging a first substrate;
  ion-exchanging a second substrate;
  after ion-exchanging the first substrate and the second substrate, attaching the first substrate to the second substrate with the adhesive layer, and
  curing the adhesive layer.

20. The method of claim 19, wherein during ion exchanging, the first substrate and the second substrate are exposed to different conditions.

21. The method of claim 19, further comprising:
creating a first hole through the first substrate prior to ion exchanging the first substrate;
creating a second hole through the second substrate prior to ion exchanging the substrate, the second hole having a cross-section similar to that of the first hole; and
aligning the first hole with the second hole when attaching the first substrate to the second substrate.

* * * * *